Nov. 6, 1956  J. L. YOUNG  2,769,234
PORTABLE PIPE BEVELING APPARATUS
Filed Dec. 22, 1954  2 Sheets-Sheet 2

JAMES L. YOUNG
*INVENTOR.*

BY *Jack W. Hayden*
ATTORNEY

United States Patent Office 2,769,234
Patented Nov. 6, 1956

2,769,234
PORTABLE PIPE BEVELING APPARATUS
James L. Young, Houston, Tex.

Application December 22, 1954, Serial No. 477,047

4 Claims. (Cl. 30—97)

The present invention relates to a portable pipe beveling apparatus.

In recovering used pipe it is necessary to cut the pipe into desired section lengths and to bevel the cut whereby the pipe may be welded together when it is reused.

An object of the present invention is to provide a portable apparatus which may be quickly and easily positioned on a pipe whereby the pipe may be severed and beveled at the same time.

Still another object of the invention is to provide a portable pipe beveling apparatus which includes a cage for supporting the apparatus on the pipe to be beveled, a head rotatably mounted on the cage and a cutter supported on the head so that the pipe may be beveled as the head and attached cutter are rotated about the pipe.

Still another object of the invention is to provide a pipe beveling apparatus comprising a cage formed of two separate portions which are hinged together whereby such cage may be positioned on a pipe to be beveled at any desired location, and a cutter rotatably mounted on the cage so that the pipe may be beveled by rotating the cutter about the cage.

Still another object of the invention is to provide a pipe beveling apparatus comprising a cage formed of two separate portions which are hinged together whereby such cage may be positioned on a pipe to be beveled at any desired location, and a cutter rotatably mounted on the cage so that the pipe may be beveled by rotating the cutter about the cage, and additional means for progressively moving the cutter inwardly so that it progressively cuts into the pipe and bevels it.

Other objects and advantages will become more readily apparent from a consideration of the following description and drawings, wherein.

Figure 1:
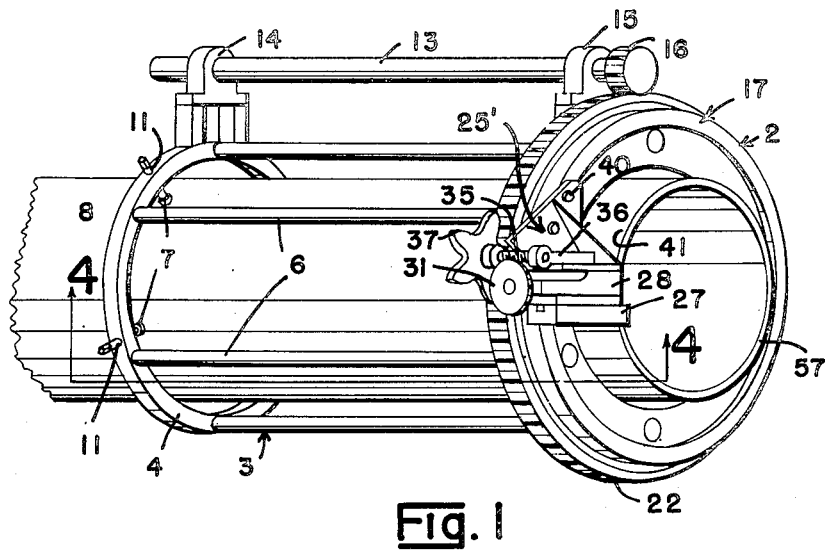
Fig. 1 is a perspective view illustrating one form of the invention.
Figure 4:
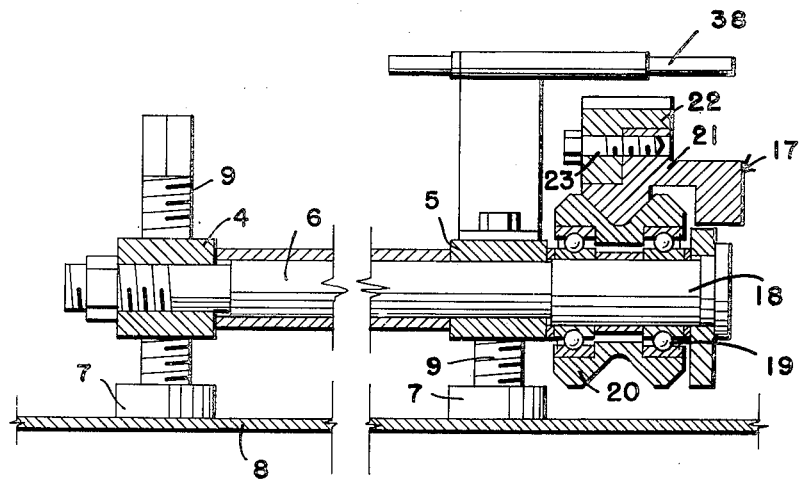
Fig. 4 is a vertical sectional view on the line 4—4 of Fig. 1.

In Fig. 1 the invention is illustrated generally at the numeral 2. Such invention is shown as including a cage denoted generally by the numeral 3 which cage includes the spaced annular ring members 4 and 5, better seen in Fig. 4 of the drawings. The rings are of a diameter to surround the pipe which is to be beveled. In the modification illustrated in Fig. 1, each of such rings are provided with a plurality of circumferentially spaced bars 6 which extend between the rings and connect them together. A plurality of circumferentially spaced supports 7 are also provided in each of the rings whereby the cage 3 may be positioned relative to the pipe 8 which is to be beveled. The supports 7 are provided with threaded areas 9 adapted to cooperate with mating threaded areas in the openings 11 in the rings whereby such supports may be adjusted so as to center each of the spaced rings 4 and 5 relative to the pipe 8.

The bars 6 may be secured to the rings 4 and 5 by any suitable means and may be of a suitable length to space the rings 4 and 5 apart a desired distance. A drive shaft 13 is mounted in the bearing supports 14 and 15 on each of the rings 4 and 5 and is provided adjacent one end with a drive gear 16 for imparting rotation to the head, generally denoted at 17, which is rotatably supported on the cage 3. The head 17 and its relationship to the cage 3 is better illustrated in Fig. 4 of the drawings, wherein such head is illustrated as being mounted on the extension 18 of the circumferentially spaced bars 6. To accommodate relative movement or rotation between the cage 3 and the head 17, suitable bearing means 19 are provided on the extensions 18 of the bars 6. Fitted on such bearings are the adapter plates 20 and 21 to which is secured the ring gear 22 by any suitable means such as the screw 23 fitting through the ring gear and into one of the adapter plates 21. The ring gear 22 is adapted to mesh with the drive gear 16 so that rotation of the drive gear 16 causes the ring gear 22 to rotate as well as the entire head 17.

A cutter 25 is secured to the head 17 and rotates therewith, it being noted that such cutter means extends laterally inwardly of said head so as to engage the pipe 8 which is to be beveled. The cutter 25 is mounted on the head 17 by means of the support generally denoted at 25'.

In the form of the invention illustrated in Fig. 1 of the drawings the support 25' is shown as including a cutter support block illustrated at 27 which is slidably mounted on stationary block 28, as will be more fully described.

Figure 3:
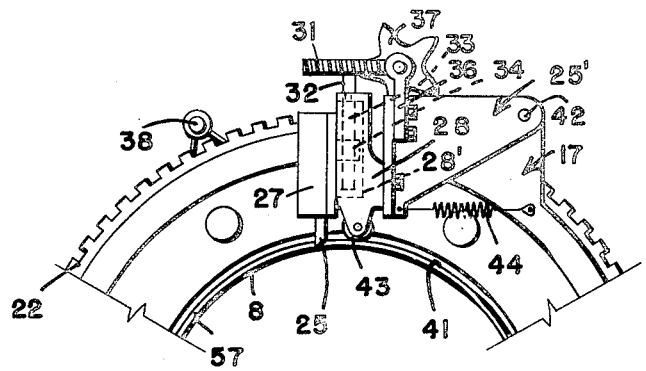
Fig. 3 is an end view illustrating the preferred form of the invention with an alternate means of mounting the cutter on the cage.

Reference may be had to Fig. 3 for a better understanding as to the sliding connection between support 27 and block 28 whereby the cutter 25 may be progressively fed or moved inwardly so as to bevel the pipe 8. In Fig. 3, a gear 31 is shown as mounted on shaft 32 which shaft extends longitudinally into the block 28 which block may be hollowed out as illustrated at 28'. The shaft 32 may be threaded so as to receive the nut 34 which is connected to the cutter support 27. Rotation of gear 31 in turn causes rotation of shaft 32 so as to feed cutter support block 27 and the cutter 25 mounted thereon inwardly toward the pipe 8.

Rotation of gear 31 may be effected by engagement of worm 35 therewith, which worm is mounted in support 36 and is provided on one end with the star wheel 37, which star wheel is adapted to be engaged by the projecting lever 38.

As the head 17 rotates, the support 25' connected therewith by any suitable means, such as bolts 40, also rotates. The cutter 25 at the beginning of the operation may be engaged with the outer surface 41 of the pipe 8 to be beveled and as the head 17 and connected cutter support 25' rotate, lever 38, which is fixed on cage 3 will be engaged by one of the arms of the star wheel. When the lever 38 is engaged, the star wheel is rotated which in turn rotates worm 35 connected therewith. This in turn rotates gear 31 and shaft 32 which extends into stationary block 28 and causes nut 34, threadedly engaged with such shaft 32, to move by reason of the rotation of the shaft 32. This in turn causes the cutter support block 27 connected to nut 34 to advance inwardly relative to the pipe 8, whereby the bevel cutter 25 connected to the support block 27 is also moved inwardly.

In Fig. 3 the cutter support 25' is illustrated as being pivotally connected to the head 17 by means of the pin 42, whereby relative movement between the cutter support 25' and the head 17 may occur due to irregularities in the pipe surface, such as for example, when the pipe is slightly out of round. In order to maintain the bevel cutter 25 in proper position against the pipe 8 to bevel it, a roller 43 is shown as being mounted on the lower end of block 28 which supports the cutter 25 in proper position. Spring means 44 is engaged between the head 17 and the cutter support 25' and positioned relative to the pivot pin 42 so as to urge the roller 43 into contact with the outer periphery 41 of the pipe 8 at all times.

Figure 2:
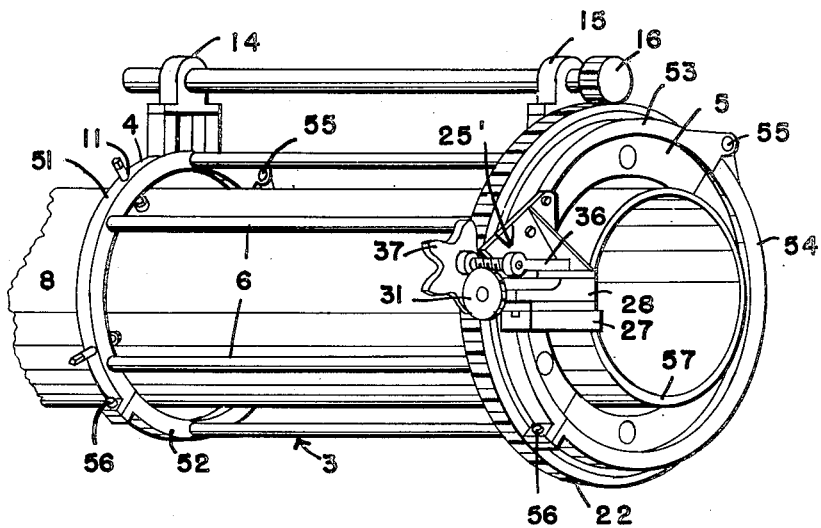
Fig. 2 is a perspective view illustrating an alternate form of the invention.

In some circumstances it may be desirable to utilize the modification illustrated in Fig. 2. In such modification each ring 4 and 5, as well as the head 17, previously described with regard to Fig. 1, is divided into two separate portions 51, 52, 53 and 54 respectively. Such separate portions may be connected together by suitable hinge means illustrated at 55, which hinge means is axially aligned on each of the rings and the head 17 so that the cage 3 and head may be opened and wrapped around the pipe 8 to be beveled. After the apparatus has been positioned on the pipe 8 to be beveled, suitable connection means as illustrated at 56 may engage the two separate portions in position to form a unitary structure. The device may then be used to bevel the pipe 8 as described with regard to Fig. 1.

While it is believed that the operation of the invention is apparent by reason of the foregoing description, to further amplify and describe it will be assumed that the apparatus is to be used for severing and beveling in situ. The cage 3 may be positioned on the pipe by means of the rings 4 and 5 and the circumferentially spaced supports 7. Suitable power means (not shown) may be connected to the shaft 13 for imparting rotation to the drive gear 16. The drive gear 16 in turn rotates connected head 17, since it is rotatably supported on the cage 3 by means of the bearing supports 19. The arrangement of the head 17 and its relationship to the bearing supports 19 and the cage 3 are better understood by referring to Fig. 4 of the drawings.

Rotation of the head 17 causes the support 25' connected therewith to rotate about the pipe 8 on which the apparatus is positioned. As the head 17 rotates, lever 38, by contacting star wheel 37, which in turn rotates worm 35, gear 31 and threaded shaft 32, causes the cutter support block 27 to advance inwardly relative to the stationary block 28, whereby the bevel cutter 25 is progressively fed through pipe 8 as the cutter support 25' is rotated therearound. It seems obvious that any suitable number of levers 38 may be positioned on the cage 3 so that the star wheel 37 may be engaged more than once if desired, during one rotation of the ring gear 22. The rate of feed of the bevel cutter 25 will depend upon the size pipe, the condition of the pipe and other such factors.

The bevel cutter 25 is shaped so that the severed end 57 of the pipe is beveled whereby it is adaptable for welding when such pipe is used at a later time. After the apparatus has simultaneously severed and beveled the pipe, it may be moved along the pipe to repeat the operation whereby the pipe may be cut into any desired length.

Under some conditions it will be more desirable to provide an apparatus which includes the hinged arrangement of Fig. 2 and in some situations it may be desirable to also provide the resiliently mounted cutter arrangement illustrated in Fig. 3 of the drawings. However, the operation of the device with the modifications of either Fig. 2 or Fig. 3 is similar to that previously described with regard to Fig. 1.

Broadly the invention relates to a portable pipe beveling apparatus.

What is claimed is:

1. A portable pipe beveling apparatus comprising, a cage surrounding the pipe to be beveled, longitudinally spaced supports on said cage and circumferentially engaging the pipe to be beveled for supporting the cage thereon, a head rotatably supported on said cage for movement about the pipe to be beveled, beveling cutter means mounted on said head and extending inwardly to engage and bevel cut the pipe on which said cage is supported, spring means associated with said head and connected to said cutter means for accommodating movement of said cutter due to irregularities in the pipe, roller means on said cutter means for supporting said cutter on the pipe as said cutter is moved thereabout, means for rotating said head about the pipe and additional means for progressively advancing the cutter inwardly as said head is rotated to progressively bevel cut the pipe.

2. A portable pipe beveling apparatus comprising, a cage for surrounding the pipe to be beveled, said cage including two separate portions, hinge means connecting said two separate portions together whereby said cage may be positioned on the pipe to be beveled, means for detachably securing said portions together to maintain said cage in position on the pipe as it is beveled, longitudinally spaced supports on said cage and circumferentially engaging the pipe to be beveled for supporting the cage thereon, a head rotatably supported on said cage for movement about the pipe to be beveled, beveling cutter means mounted on said head and extending inwardly to engage and bevel cut the pipe on which said cage is supported, spring means associated with said head and connected to said cutter means for accommodating movement of said cutter due to irregularities in the pipe, roller means on said cutter means for supporting said cutter on the pipe as said cutter is moved thereabout, means for rotating said head about the pipe and additional means for progressively advancing the cutter inwardly as said head is rotated to progressively bevel cut the pipe.

3. A portable pipe beveling apparatus comprising a cage, said cage including, a pair of spaced rings of a diameter to surround the pipe to be beveled, a plurality of circumferentially spaced supports in each of said rings for engaging the pipe to be beveled and supporting said rings thereon, a plurality of circumferentially spaced bars extending between said rings for connecting said rings together, a head rotatably supported on one of said rings, a beveling cutter means mounted on said head and extending laterally inwardly of said head to engage and bevel cut the pipe on which the apparatus is supported, spring means associated with said head and connected to said cutter means for accommodating movement of said cutter due to irregularities in the pipe, roller means on said cutter means for supporting said cutter on the pipe as said cutter is moved thereabout, means for rotating said head about the pipe and additional means for progressively advancing the cutter inwardly as said head is rotated to progressively bevel cut the pipe.

4. A portable pipe beveling apparatus comprising a cage, said cage including a pair of spaced rings of a diameter to surround the pipe to be beveled, each of said rings comprising two separate portions, hinge means connecting said two separate ring portions together whereby said ring portions may be positioned about the pipe to be beveled, means for detachably securing said ring portions to maintain them in position on the pipe as it is beveled, a plurality of circumferentially spaced supports in each of said rings for engaging the pipe to be beveled and supporting said rings thereon, a plurality of circumferentially spaced bars extending between said rings for connecting said rings together, a head rotatably supported on one of said rings, a beveling cutter means mounted on said head and extending laterally inwardly of said head to engage and bevel cut the pipe on which the apparatus is supported, spring means associated with said head and connected to said cutter means for accommodating movement of said cutter due to irregularities in the pipe, roller means on said cutter means for supporting said cutter on the pipe as said cutter is moved thereabout, means for rotating said head about the pipe and additional means for progressively advancing the cutter inwardly as said head is rotated to progressively bevel cut the pipe.

References Cited in the file of this patent

UNITED STATES PATENTS

| | | |
|---|---|---|
| 587,093 | French | July 27, 1897 |
| 1,029,265 | Borden | June 11, 1912 |
| 1,178,801 | Griffin | Apr. 11, 1916 |
| 1,310,957 | Nonneman | July 22, 1919 |
| 2,271,582 | Dixon | Feb. 3, 1942 |
| 2,293,754 | Ludke et al. | Aug. 25, 1942 |
| 2,672,682 | Studebaker et al. | Mar. 23, 1954 |
| 2,699,604 | Ingwer et al. | Jan. 18, 1955 |